United States Patent Office 3,327,179
Patented June 20, 1967

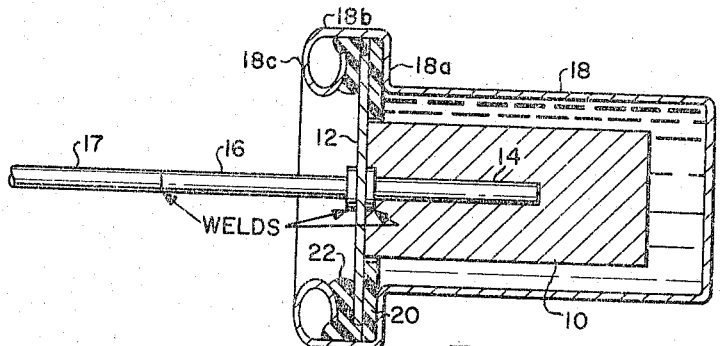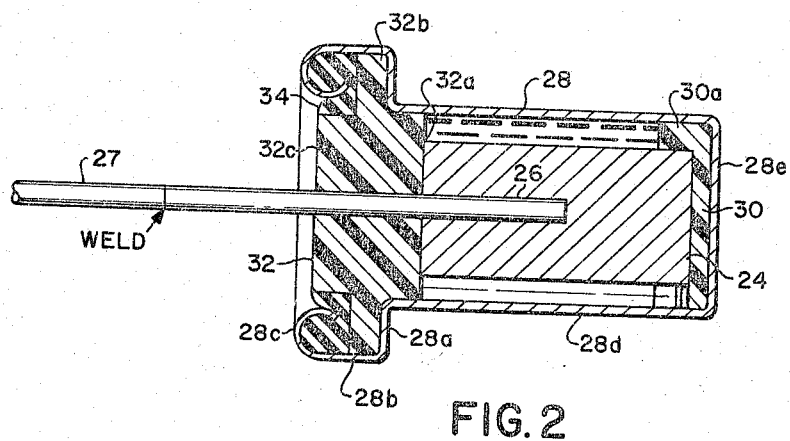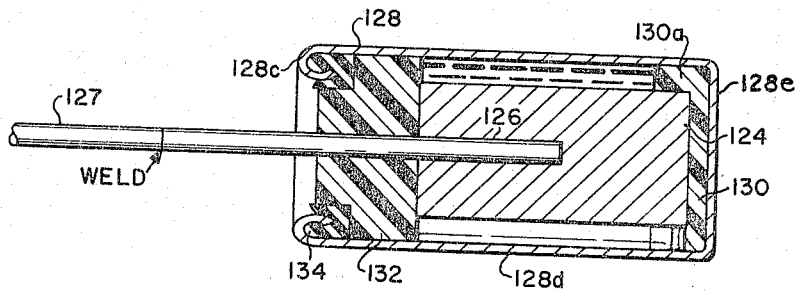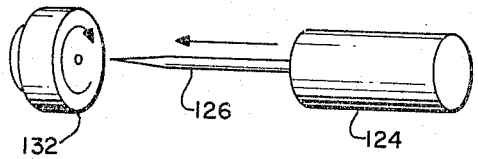
INVENTOR.
WILBERT G. BAILEY
BY
ATTORNEY

3,327,179
ELECTROLYTIC CAPACITORS COMPRISING IMPROVED END SEAL STRUCTURE
Wilbert G. Bailey, Wrentham, Mass., assignor to Cornell-Dubilier Electric Corporation, a corporation of Delaware
Filed Mar. 5, 1964, Ser. No. 349,694
8 Claims. (Cl. 317—230)

The present invention relates to electrolytic capacitors and particularly to capacitors having an anode of a rigid sintered body of a film-forming metal.

The present invention is particularly advantageous in connection with so-called wet electrolytic capacitors having tantalum anodes and for this reason the description that follows refers to such capacitors. However, it will be appreciated that the invention has broader application.

Over the years there has been intensive development effort connected with providing an end-seal for wet electrolytic capacitors, to provide an insulated connection for the anode and to contain the electrolyte. Any leakage through the seal not only deprives the electrodes of electrolyte but also promotes deterioration of the anode terminal and degradation of the electrical characteristics of the capacitor.

The foregoing problem has been met heretofore by devising a capacitor in which a sintered anode of tantalum is formed with a so-called "tack" including a wire of tantalum embedded in the sintered anode body and a sheet-metal disc of tantalum jointed to the wire projects as a flange at one end of the anode. Such a sheet-tantalum disc has been incorporated in various forms of insulating seals and has found relatively wide acceptance in its various forms.

An object of the present invention resides in the provision of a novel capacitor of the foregoing type having an improved end-seal in which the disc is eliminated. Through this object a substantial reduction in cost of such capacitors is realized, and at the same time improvement in certain operating characteristics is realized through elimination of inherent defects identified with the disc.

The nature of the invention in its various aspects will be appreciated from the following detailed description thereof in relation to a representative prior-art type of construction that has heretofore been used widely. In the description, reference is made to the annexed drawings wherein:

FIG. 1 is an enlarged longitudinal cross section of an illustrative prior-art type of tantalum-anode electrolytic capacitor;

FIG. 2 is a longitudinal cross section of a like capacitor incorporating novel features of the present invention;

FIG. 3 is a modification of the capacitor in FIG. 2, embodying certain novel features of the invention; and FIG. 4 illustrates an operation in the assembly of the capacitors shown in FIGS. 2 and 3.

Referring now to FIG. 1 of the drawing, a conventional from of wet tantalum capacitor is illustrated, of the so-called "top-hat" construction. This capacitor includes an anode 10 of sintered tantalum that is united to a wafer or disc 12 of tantalum, a wire 14 of tantalum extending axially from disc 12 into anode 10. The anode is normally made by compacting tantalum powder with a suitable binder around the wire 14 and sintering the compacted tantalum. Disc 12 is welded to the end of the wire 14. An external wire 16 as of tantalum is butt-welded to the disc 12. The welds may be made at the various times after the disc and the anode are welded to each other. The anode including disc 12 and part of wire 14 is subjected to an anodic forming treatment to produce a critical form of oxide film.

A can 18 as of silver forms the cathode of the capacitor. Can 18 contains an electrolyte as of sulphuric acid, typically 30 to 40% by weight of concentrated sulphuric acid in water. Can 18 has cylindrical lateral walls, and a laterally outward-extending shouder 18a. An axial wall portion 18b extends from the periphery of the shoulder 18a, portion 18b terminating in an in-turned bead 18c. Disc 12 is confined between a washer 20 as of tetrafluorethylene and a washer 22 as of neoprene or other synthetic rubber or any other suitable resilient solid material, i.e., elastomer. In manufacturing the capacitor, the disc 12 is deposited in can 18 on a washer 20, another washer 22 is placed against disc 12, and then bead 18c is formed so that disc 12 is tightly gripped between washers 20 and 22. Disc 12 is thereby pressed firmly against the confronting surface of washer 20 which is, in turn, pressed tightly against shoulder 18a. Washer 20 is electrically insulating, it is capable of limited plastic flow to conform to the confronting metal surfaces, and it is chemically inert, thereby to provide an electrically insulating seal intended to confine the electrolyte against leakage. Any slight amount of electrolyte that might leak past this washer 20 would tend to attack washer 22 chemically and produce an electrical leakage path from bead 18c to disc 12. Such leakage would badly degrade the electrical characteristics of the capacitor.

A persistent source of difficulty in the manufacture of capacitors in the form of FIG. 1 relates to the development of a crystalline form of oxide during the welding operations on the tantalum disc 12. All of the tantalum of the anode that is exposed to the electrolyte should be covered by an amorphous oxide that is produced in the anodic forming treatment. Any crystalline oxide remaining after the welding operation acts as a seed that spreads, causing progressive crystalization of the amorphous anodically formed oxide film. The crystalline form of oxide is considered responsibe for high leakage current in contrast to a low level of leakage current realized with an ideal continuous amorphous formed film of oxide.

The capacitor illustrated in FIG. 2 is of the identical external configuration as that in FIG. 1 but embodies features of the present invention that improve the capacitor in several respects. In FIG. 2 anode 24 of sintered tantalum is compacted about a wire 26 of tantalum, this wire projecting considerably beyond the end of sintered body 24. An extension of nickel 27 is butt-welded to wire 26, as the terminal lead. Can 28 contains anode 24 in an electrolyte, the can being the cathode of the capacitor and being imperforate in the sense that it does not allow escape or evaporation of the contained electrolyte. The can includes a shoulder portion 28a, an endwise extending portion 28b, and an in-turned bead or inwardly curled portion 28c. The lateral wall 28d is cylindrical, and this wall is closed at one end 28e.

At one end of anode 24 there is a spacer 30 of a dimensionally stable, relatively stiff plastomer that is inert to the electrolyte. Tetrafluorethylene is especially suitable. Spacer 30 includes a few fingers 30a that extend between anode 24 and both the lateral wall 28d and the end wall of can 28. A body of tetrafluorethylene 32 at the opposite end of the anode includes an inward-extending central portion of plug 32a, a flange portion 32b, and an outward-extending or raised central portion 32c. A nonporous neoprene gasket 34 surrounds central projection portion 32c and confronts flange 32b. Inward projecting portion 32a fits tightly against the side wall 28d of the can. Wire 26 extends through body 32 at its center, the body being relatively thick and thus providing a seal of extended length along wire 26. Anode 24 is confined endwise between bodies 30 and 32, and it is spaced from the lateral wall of the can and held in place mechanically by those bodies. Washer 34 is an elastomer which is tightly compressed by bead 28c and is forced tightly against the periphery of the raised center portion 32c of body 32, elastomer 34 being also tightly compressed against flange portion 32b and thereby forcing that flange tightly against shoulder 28a of the can. The material of which body 32 is formed tends to flow slightly and thus it tends to conform intimately to the surface irregularities that may exist in the metal of which the can is formed. The washer 34 being of elastic properties and being compressed by bead 28c maintains the pressure holding flange 32b against shoulder 28a. This construction provides a highly effective seal preventing leakage of electrolyte.

To the extent that any minimal amount of electrolyte might leak past the seal in FIG. 2, the consequence would be much less severe than in a capacitor made as in FIG. 1. In the latter, the surface path that separates the can from the exposed portion of the disc is extremely short and thus any electrolyte bridging the insulating material in that region provides a path for leakage current and attacks the insulation that augments the electrical leakage. Even more significant, however, is the fact that in the capacitor of FIG. 2 there are no welds anywhere near the anode metal that is exposed to the electrolyte. There is no danger of the butt weld between wires 26 and 28 causing recrystallization of the oxide in the anode film. Thus, the elimination of the tantalum disc and the related structure avoids a very serious problem that leads to deterioration of the electrical characteristics of such a capacitor.

The end-seal construction in capacitors of the form in FIGS. 1 and 2 are intended to provide a reliable seal for containing the electrolyte. A substantial number of units as in FIG. 2 were tested according to MIL Std. 202 tests and yielded virtually perfect results, demonstrated the efficacy of the seal. Included among the test are temperature cycling between —55° C. and at 125° C. followed by electrical testing, and temperature-shock cycling. Units of style CL44 (as shown) case size T3 fully satisfied the requirements of MIL-C-3965C and MIL-C-3965/4c. (The foregoing test standards, style CL44, case size T3 and MIL-C specifications are all widely published U.S. Government Military Standards.) Furthermore, the construction in FIG. 2 has demonstrated its superiority, in that the number of leaky units found in production is sharply lower than in production of units as in FIG. 1 under the same manufacturing conditions.

A further embodiment of certain aspects of the present invention is illustrated in FIG. 3. In that capacitor, a sintered tantalum anode 124 has a part of tantalum wire 126 embedded therein, wire 126 extending from one end of the anode for a substantial distance, where it is butt-welded to a terminal wire 27 that is more suitable for making circuit connections. Silver cathode can 128 has a cylindrical lateral wall 128d, and end wall 128e, and a turned-in bead 128c. A spacer 30 is disposed between anode 124 and can end 128e, and fingers 130a extend between anode 124 and the lateral wall 128d of the can. Another body of tetrafluorethylene 132 includes a central portion 132c whose face is peripherally relieved as shown to form a recess that receives an elastomer such as non-porous neoprene washer 134. Wire 126 extends through the center of body 132 and body 132 has a press fit in can 128 that forms a seal against the lateral wall 128d of the can. Bodies 130 and 132 are forced tightly against each other by portions 128c and 128e of the can, and bodies 130 and 132 also maintain anode 124 centered in the can, the construction being mechanically strong and effectively well adapted to resist mechanical shocks. Parts 126, 124, 128, 130, 132 and 134 are assembled as shown and high endwise pressure is built up when portions 128c are spun over and forced against the washer 134, in producing the assembly illustrated. Before the end-seal construction is completed, the space in can 128 around anode 124 is filled with the same electrolyte as in the embodiment of FIG. 2.

In common with the embodiment of FIG. 2, that construction shown in FIG. 3 is free of any tantalum welds in any region that could become exposed to electrolyte and consequently the only oxide that is exposed to the electrolyte is the oxide that is anodically formed under carefully controlled conditions, on the sintered anode 124. Capacitors made in accordance with FIG. 3 have been tested and found very successful in meeting military test specifications. The construction was found to be remarkably effective in the face of extreme temperature-shock tests, many units of a test sample of these capacitors having been subjected to alternate exposures to —55° C. and 125° C., fifteen minutes at each temperature through five cycles, without coming to rest at room temperature between high and low-temperature exposures. Five cycles of such temperature-shock testing demonstrated remarkable immunity to electrolyte leaks.

One of the manufacturing steps of significance in relation to the end-seal construction is illustrated in FIG. 4. When anode 124 and wire 126 are first assembled, wire 126 projects much farther from anode 124 than in the finished unit. The free end of wire 126 in this stage of manufacture is sharpened with a needle point. It is carefully centered opposite member 132, and while that member 132 is rotated at moderately high speed, the pointed wire 126 is forced into and through body 132. Wire 126 is cut and wire 127 (FIG. 3) is butt-welded to the cut end of wire 126. Because the butt weld is sufficiently far removed from anode 124, any oxide that might develop during the butt-welding process is reliably removed from all possible exposure to the electrolyte. Anode 124 is subjected to an anodizing oxide-forming treatment, in which a part of wire 126 is submerged in order that assurance may be had that the entire anode 124 had been effectively exposed in the forming treatment. As a result of this method of terminal-wire insertion, the portion of body 132 that is in contact with wire 126 in the finished capacitor is under relatively firm compressive stress and makes a highly effective seal to wire 126. A firm compressive stress of the tetrafluorethylene body 32 about the anode lead wire 26 in FIG. 2 is produced in the same way.

It will be recognized that the foregoing represent two presently preferred embodiments of the invention in its various aspects. However, those skilled in the art will recognize that a latitude of modification and substitution may readily be made and, therefore, the invention should be construed broadly in accordance with its full spirit and scope.

What I claim is:

1. An electrolytic capacitor including an anode in the form of a rigid sintered tantalum body, a tantalum terminal wire embedded in the body and projecting from an end thereof, an enclosing can of silver about said anode, said can being open at one end and including an imperforate end wall opposite said open end and imperforate lateral walls, said lateral walls including a cylindrical wall and a shoulder extending outward therefrom and spaced from said open end, an electrolyte within said can about said anode, a spacing body of tetrafluorethylene at one end of said anode interposed between said anode and both said end wall and said lateral walls of the can, and electrical insulating means constituting a seal about said wire and closing the open end of the can, said last-named means including a sealing body of tetrafluorethylene having a flange portion extending laterally outward and having inner and outer central portions that project in opposite directions from said flange portion, a gasket of neoprene surrounding and bearing against the outer central portion of said sealing body and bearing against the adjoining surface of said flange portion, said can having an inward curled bead that bears against said gasket so that the gasket is forced against the outer projecting body portion and against said flange portion, the latter being thereby forced against said shoulder portion of the can, the inner projecting portion of said sealing body extending across said cylindrical portion of said can adjacent said shoulder, the proportions of said can and said tetrafluorethylene bodies and said anode being related so that said anode is confined endwise between said tetrafluorethylene bodies, said sealing body of tetrafluorethylene being penetrated by said tantalum wire and the portion of said sealing body engaging said wire being tightly in compression.

2. An electrolytic capacitor including a sintered tantalum anode having a tantalum terminal wire embedded therein and projecting from one end thereof, an enclosing can about said anode constituting the cathode of said capacitor, said can being open at one end and including an imperforate end wall and imperforate lateral walls, an electrolyte within said can about said anode, a spacing body of mechanically stable and chemically inert insulating material at one end of said anode interposed between said anode and both said end wall and said lateral walls of the can, and electrical insulating means constituting a seal about said wire and closing the open end of the can, said last-named means including a sealing body of a relatively stiff insulating plastomer that is chemically inert relative to said electrolyte, said sealing body having a central portion about said wire and an externally relieved peripheral portion, said can having an in-turned bead confronting said relieved portion and the portion of said can which laterally encloses said sealing body being essentially cylindrical, and a gasket of a substantially nonporous elastomer confined between said bead and both said central portion and said relieved portion of said sealing body, the can being proportioned in relation to said anode and said inert bodies and said gasket so that said tantalum anode abuts and supports the peripheral portion of said sealing body against the endwise pressure applied to said gasket by said bead, said sealing body being penetrated by said tantalum wire, and the portion of said sealing body engaged by said wire being highly compressed.

3. An electrolytic capacitor in accordance with claim 2 wherein said sealing body comprises an aperture with said terminal wire in forced penetration therein and the walls of the aperture being in compressed sealing engagement with the surface of said wire.

4. An electrolytic capacitor including a sintered anode having a terminal wire embedded therein and projecting from an end thereof, an enclosing can about said anode constituting the cathode of the capacitor, said can being open at one end and closed at the opposite end and including a cylindrical lateral wall about said anode and at least one laterally extending wall portion substantially transverse to said cylindrical lateral wall, an electrolyte within said can about said anode, a chemically inert but mechanically firm insulating body spacing said anode from the closed end of said can, and electrical insulating means constituting a seal about said wire and closing the open end of the can, said last-named means including a sealing body of a firm insulating plastomer penetrated by said wire, said anode being confined by said sealing and spacing bodies, the peripheral area of said sealing body being in engagement with said lateral wall of the can and being laterally enclosed thereby, an in-turned bead on said can, and a gasket of a non-porous elastomer disposed between said bead and the peripheral end surface of said sealing body, the minimum diameter of the lateral wall portion engaged by said peripheral area and laterally enclosing said sealing body between said bead and said laterally extending substantially transverse wall portion of the can being at least substantially as great as the diameter thereof at the base of said bead at said sealed end of the can, said one laterally extending wall portion exerting a reaction force on said sealing body opposing the endwise pressure of said bead for maintaining said gasket compressed between said bead and said end surface, and said sealing body being under high-compression sealing stress in the area penetrated by and in contact with said terminal wire.

5. An electrolytic capacitor in accordance with claim 4 wherein said one laterally extending wall portion is a shoulder portion extending laterally outward of said cylindrical wall, said shoulder portion confronting said bead, and wherein said sealing body includes a flange portion engaged by said gasket, the gasket and said flange portion being tightly confined between said shoulder portion and said bead, and wherein said sealing body additionally includes an inward-extending plug portion fitting tightly against the lateral wall portion of the can adjacent to said shoulder portion, said inward-extending plug portion abutting one end of said anode.

6. An electrolytic capacitor in accordance with claim 4 wherein said one laterally extending wall portion constitutes an end wall closing said can at said opposite end, said reaction to the endwise sealing pressure of the bead acting free of obstruction by the wall of the can via said spacing body, said sealing body and said gasket against said in-turned bead.

7. An electrolytic capacitor in accordance with claim 4 wherein said sealing body comprises an aperture with said terminal wire in forced penetration therein and the walls of the aperture being in compressed sealing engagement with the surface of said wire.

8. An electrolytic capacitor including a sintered anode having a terminal wire embedded therein and projecting from an end thereof, an enclosing can about said anode, said can being open at one end and closed at the opposite end and containing an electrolyte, and electrical insulating means constituting a seal about said wire and closing the open end of the can, said last-named means including a sealing body of tetrafluorethylene having a laterally extending flange and a central portion of considerably greater thickness than said flange penetrated by said terminal wire, a nonporous elastomeric gasket at the outward end surface of said flange, said can having a cylindrical portion and a shoulder portion extending laterally outward therefrom against a confronting surface of said flange, and said can having a bead turned in against said gasket and pressing the gasket tightly against said flange portion of said sealing body and holding said flange portion tightly against said shoulder portion of the can, said sealing body of tetrafluorethylene being in tight compression against said terminal wire where it is penetrated thereby.

References Cited
UNITED STATES PATENTS

| | | | |
|---|---|---|---|
| 2,766,408 | 10/1956 | Georgiev | 317—230 |
| 2,884,575 | 4/1959 | Lilienfeld | 317—230 |
| 3,243,316 | 3/1966 | O'Nan | 317—230 |
| 3,255,388 | 6/1966 | Sporing | 317—230 |

JAMES D. KALLAM, *Primary Examiner.*